(12) United States Patent
Van Saarloos

(10) Patent No.: US 7,460,569 B2
(45) Date of Patent: Dec. 2, 2008

(54) SOLID STATE UV LASER

(75) Inventor: Paul Van Saarloos, Gwelup (AU)

(73) Assignee: CLVR Pty Ltd., Balcatta (AU)

( * ) Notice: Subject to any disclaimer, the term of this patent is extended or adjusted under 35 U.S.C. 154(b) by 132 days.

(21) Appl. No.: 10/516,103

(22) PCT Filed: May 30, 2003

(86) PCT No.: PCT/AU03/00688

§ 371 (c)(1),
(2), (4) Date: Nov. 30, 2004

(87) PCT Pub. No.: WO03/102665

PCT Pub. Date: Dec. 11, 2003

(65) Prior Publication Data

US 2005/0254532 A1    Nov. 17, 2005

(30) Foreign Application Priority Data

May 30, 2002  (AU) .................................. PS2663

(51) Int. Cl.
*H01S 3/10* (2006.01)
*G02F 1/35* (2006.01)
(52) U.S. Cl. .................. 372/22; 372/21; 359/326; 359/328
(58) Field of Classification Search ............. 372/21–22; 359/326, 328
See application file for complete search history.

(56) References Cited

U.S. PATENT DOCUMENTS 4,178,561 A  12/1979 Hon et al.
4,346,314 A  8/1982 Craxton (Continued)

FOREIGN PATENT DOCUMENTS

WO  WO 99/04317 A  1/1999

OTHER PUBLICATIONS

International Search Report.
Patent Abstracts of Japan, JP 2000-075235 A (Aisin Seiki Co Ltd), Mar. 14, 2000 *Abstract.

(Continued)

*Primary Examiner*—Minsun Harvey
*Assistant Examiner*—Phillip Nguyen
(74) *Attorney, Agent, or Firm*—Stephen A. Bent; Alexey V. Saprigin; Foley & Lardner LLP

(57) ABSTRACT

An apparatus (10a) for scanning a light beam (16) through a crystal arrangement (22) that has a first frame member (28), a first support member (24) to support a first optical element (18) in the first frame member (28) and a drive mechanism (32) to rotate the first support member (24). The first support member (24) is rotatably mounted in the first frame member (28). The first optical element (18) is arranged to receive the light beam (16). The first optical element (18) is supported by the first support member (24) so that the first optical element (18) is rotatable with the first support member (24). The first optical element (24) is tiltable about a diametral line of the first optical element (18), relative to the axis of the light beam (16) to be scanned through the crystal arrangement (22). A frequency conversion apparatus (50) provides a first crystal set (52) and a second crystal set (54). Each of the first and second crystal sets (52, 54) has at least one non-linear optical crystal. The first crystal set (52) receives a beam (16) of coherent radiation that passes through the first crystal set (52). The second crystal set (54) receives the beam (16) after it passes through the first crystal set (52), and the beam (16) then passes through the second crystal set (54). One of the first and second crystal sets (52, 54) is aligned for frequency conversion of the beam (16) in the cold state of that crystal set and the other one of the first and second crystal sets (52, 54) is aligned for frequency conversion of the beam (16) in the warm steady state of that other crystal set.

14 Claims, 7 Drawing Sheets

U.S. PATENT DOCUMENTS

| | | | |
|---|---|---|---|
| 5,040,860 A | | 8/1991 | Klotz, Jr. |
| 5,144,630 A | | 9/1992 | Lin |
| 5,543,954 A | | 8/1996 | Nicholson |
| 5,646,764 A | | 7/1997 | Moore et al. |
| 5,805,626 A | * | 9/1998 | Komatsu et al. .............. 372/41 |
| 6,002,697 A | * | 12/1999 | Govorkov et al. ............. 372/34 |
| 6,381,255 B1 | * | 4/2002 | Van Saarloos et al. ......... 372/9 |
| 6,441,948 B1 | * | 8/2002 | Wu et al. .................... 359/326 |
| 2003/0112493 A1 | * | 6/2003 | Jovanovic et al. ........... 359/330 |
| 2005/0163173 A1 | * | 7/2005 | Reid et al. .................... 372/21 |

OTHER PUBLICATIONS

Derwent Abstract Accession No. 91309189/42, SU 1610464 A (Cosmic Res Combine) Nov. 30, 1990 *Abstract.

Patent Abstracts of Japan, JP 07-022686 A (Toshiba Corp) Jan. 24, 1995, *Abstract.

Patent Abstracts of Japan, JP 2000-221554 A (Ushio Sogo Gijutsu et al.) Aug. 11, 2000, *Abstract.

* cited by examiner

SOLID STATE UV LASER

FIELD OF THE INVENTION

The present invention relates to solid state laser technology. The present invention finds application, for example, in surgical and medical fields, including the correction of refractive errors of the eye by photo refractive keratectomy (PRK) and laser in-situ keratomileusis (LASIK). The present invention also has application in material processing fields, including photolithography, such as the manufacture of microchips, writing defraction gratings in fibre optic cables and glass marking.

BACKGROUND OF THE INVENTION

This specification refers to and describes content of U.S. Pat. Nos. 4,346,314, 5,144,630 and 5,592,325 and international patent application PCT/AU98/00554 (WO 99/04317). However, neither the disclosures in those US patents and international patent application nor the descriptions contained herein of those US patents and international patent application are to be taken as forming part of the common general knowledge solely by virtue of the inclusion herein of the reference to and description of content that those U.S. patents and international patent application. Furthermore, this specification describes aspects of prior art lasers. However, neither such aspects of prior art lasers nor the description contained herein of such aspects of prior art lasers is to be taken as forming part of the common general knowledge solely by virtue of the inclusion herein of reference to and description of such aspects of prior art lasers.

Excimer gas lasers with an operating wavelength of 193 nm in the ultraviolet (UV) region of the electromagnetic spectrum have been utilised in many of the above applications. The short UV wavelength of these lasers processes material through photoablation. The material being processed is vaporized by the laser but little thermal damage is caused to adjacent areas. This has led to the widespread use of excimer lasers in the medical field. However, excimer lasers do have disadvantages. These disadvantages include poor reliability, high operating costs, and the need to use an extremely toxic gas. The gas also has a limited lifetime in the laser cavity and so must be replaced frequently. This adds the difficulties associated with handling and shipping a dangerous gas to the excimer laser disadvantages.

On the other hand, solid-state lasers are smaller, more reliable and easier to use than gas excimer lasers. These lasers utilize glass or crystal matrices, such as yttrium aluminium garnet (YAG), yttrium lithium fluoride (YLF) or potassium gadolinium tungstate (KGW) that are doped with rare-earth elements such as neodymium (Nd), erbium (Er) or holmium (Ho). Solid-state lasers are identified by the element and glass or crystal used. For example, a laser using a YAG crystal doped with neodymium is denoted Nd:YAG. This material is referred to as the laser medium. Excitation of the laser medium, usually by either flash lamp or diode lasers, results in high-energy laser emissions. These high-energy laser emissions have a variety of wavelengths. The rare-earth element in the laser medium determines the wavelengths that are produced. However, none of these solid state lasers produce laser emissions that are in the UV wavelength range of the laser emissions produced by excimer lasers. Some of the more common solid state lasers and the wavelengths of their laser emissions are Nd:KGW at 1.067 microns, Nd:YAG at 1.064 microns, Nd:YLF at 1.053 microns, Ho:YAG at 2.1 microns and Er:YAG at 2.94 microns. These are all in the infra-red portion of the electromagnetic spectrum, i.e. they have a (relatively) much longer wavelength than that of gas excimer lasers.

Whilst solid state lasers produce beams having longer wavelengths than those of gas excimer laser, they have been successfully applied to different medical and industrial processes. Even so, the longer infra-red wavelengths produced by solid state lasers makes them unsuitable for most of the applications using excimer lasers. Furthermore, they may produce undesirable effects when applied to some materials, such as corneal tissue.

It is possible to use non-linear optical (NLO) crystals to convert the infra-red wavelengths produced by solid state lasers, to shorter visible and ultraviolet wavelengths. U.S. Pat. No. 5,144,630 describes the use of non-linear optical crystals for frequency conversion of high intensity laser emission. This property of NLO crystals means that passage of a laser beam through such a crystal can result in the wavelength of the beam being altered. This property enables the laser beam produced by an infra-red laser, such as Nd:YAG at 1064 nm, to be converted to a shorter wavelength of 532 nm. This process is known as harmonic generation (and is described in U.S. Pat. No. 5,592,325 and U.S. Pat. No. 4,346,314). Converting an original infra-red laser beam, at 1064 nm, to a beam with a wavelength at 532 nm is known as second harmonic generator (SHG). The ability to generate higher harmonics, such as the fourth and fifth harmonic wavelengths of a Nd:YAG laser, at 266 nm and 213 nm, respectively, means that the solid state laser becomes suitable for further applications.

There is a wide range of non-linear optical crystals that can be used for harmonic generation to shorter wavelengths. Examples are crystals of the borate family, and include beta barium borate ($\beta$-BaB$_2$O$_4$ or BBO), lithium borate (LBO), caesium lithium borate (CLBO), MBeBo$_3$F$_2$ and CsB$_3$O$_5$. Other examples of NLO crystals for harmonic generation include Potassium Titanyl Phosphate (KTP or KTiOPO$_4$) and potassium Dideuterium Phosphate (KD*P or KD$_2$PO$_4$) (as described in U.S. Pat. No. 5,144,630 and U.S. Pat. No. 5,592,325).

For the harmonic generation process to work properly, the laser beam must pass through the non-linear crystal at exactly the right angle relative to the crystal structure. A very small error in the angle that the laser beam passes through the crystal can cause the conversion efficiency to drop significantly, possibly even to zero. Fundamental problems exist with non-linear optical crystals. Firstly, the exact required angle through the crystal usually depends on the temperature of the crystal and temperature gradients within the crystal. Secondly, the crystal usually absorbs a little of either or both the incident longer wavelength and the newly generated harmonic shorter wavelength. This absorbed laser energy heats the crystal, changing its temperature and creating temperature gradients within the crystal. Thus, the required angle through the crystal for efficient harmonic generation when the crystal is cold, i.e. at the time the laser has just been switched on, is different from the required angle when the laser has been running for a while and its heating of the crystal has reached a steady state. When a laser is first switched on and the laser beam passes through the crystal at the angle required for warm steady state efficient harmonic generation, it is not unusual for there to be no harmonic generation at all. In such an instance, the harmonic wavelength cannot contribute to heating of the crystal, and therefore the temperature state of the crystal that produces any harmonic generation is never reached. Even when the differences in angles between the cold starting condition and the warm steady state condition are not sufficient enough to create the problem described above, the changes in optimum angle do create long warm-up times and potentially large swings in the energy of the generated harmonic wavelength. To reach the fourth or fifth harmonic, for example 266 nm or 213 nm for Nd:YAG, the conversion process usually requires two or three crystal stages respectively. The instabilities of energy are thus multiplied for these shorter wavelengths. Therefore these solid state UV wavelength laser sources have generally been considered unsuitable for industrial or medical applications.

One proposed solution was to keep the laser pulse repetition rate low to allow the crystal to cool and partially return to its initial state between pulses (as described in international application PCT/AU98/00554). However, in many industrial applications the low pulse repetition rate makes the application uneconomic due to slow material processing rates. Even in the medical applications of laser refractive surgery, the low pulse repetition rate can lead to impractically long treatment times. This is particularly true in the newer types of treatments based on topography or wave front linked customized ablations that require many smaller pulses to be applied to the cornea.

Thus, solid state UV lasers still have undesirable instability issues. With improvements in diode lasers in recent times there is now a preference that solid state lasers are diode laser pumped instead of flash-lamp pumped. Diode laser pumped solid state lasers are potentially more reliable and have better energy stability in their infra-red laser output than flash-lamp pumped solid state lasers. However, diode laser pumped systems are extremely inefficient at the low pulse repetition rates proposed in the solution mentioned above. Therefore, diode laser pumped solid state lasers, in particular, need a better solution to the instabilities of generating UV wavelengths through non-linear optical frequency conversions.

DISCLOSURE OF THE INVENTION

In accordance with a first aspect of the present invention there is provided an apparatus for scanning a light beam through a crystal arrangement comprising:
 a first frame member,
 a second frame member spaced from said first frame member by a distance sufficient to accommodate the crystal arrangement,
 a first support member to support a first optical element in said first frame member so that said first optical element is tiltable about a diametral line of said first optical element, said first support member being rotatably mounted in said first frame member and said first optical element being arranged to receive said light beam,
 a second support member to support a second optical element in said second frame member so that said second optical element is tiltable about a diametral line of said second optical element, said second support member being rotatably mounted in said second frame member and said second optical element being arranged to receive said light beam after passage through said crystal arrangement, and
 drive means to rotate said first and second support members and thereby said first and second optical elements while tilted, in phase, whereby said light beam is scanned over said crystal arrangement and its path through the crystal arrangement changes while its orientation does not change, which drive means includes a rotatable shaft transversely spaced from the axis of said light beam and rotationally drivingly coupled to said first and second support members.

Preferably, passage of the light beam through said first optical element results in the path of said light beam, after passage through said first optical element, being deviated from its path prior to passage through said first optical element, and rotation of said first optical element results in the deviated beam spatially moving over time such that the path of the deviated beam through said crystal arrangement changes to thereby scan said light beam through said crystal arrangement.

A beam scanning device may be provided on the beam output side of the crystal arrangement.

Preferably, the scanned light beam output from said crystal arrangement is directed to said second optical element to return said deviated beam to a beam that does not spatially move over time to thereby descan said light beam.

Preferably, each of the first and second optical elements is tiltable at an angle to the axis of the light beam and is rotatable about an axis that is substantially parallel to the axis of said light beam.

Preferably, the first and second optical elements are tiltable in opposite directions relative to the axis of said light beam.

Preferably, said drive means comprises a motor and a drive shaft extending therefrom, a first wheel mounted on said drive shaft and a second wheel connected with said first support member and belt means extending between first and second wheels to transfer rotational drive from said drive shaft to said first support member via said first and second wheels and said belt means to thereby rotate said first support member and said first optical element.

Preferably, said drive shaft extends from said motor toward said second frame member and is transversely spaced from the axis of said light beam, a third wheel is mounted on said drive shaft, a fourth wheel is connected with said second support member and second belt means extends between said third wheel and said fourth wheel such that rotational drive of said drive shaft is transferable to said second support member via said third and fourth wheels and said second belt means to thereby rotate said second support member and said second optical element.

Preferably, said drive means is supported by bracket means connected to at least said first frame member.

Preferably, said bracket means comprises a first bracket and a second bracket connected to said first frame member and said second frame member, respectively, said first bracket supporting said motor and said first wheel and said second racket supporting said third wheel and the distal end of said drive shaft.

The apparatus for scanning a light beam through a crystal arrangement as hereinbefore described may be incorporated into a laser apparatus which also comprises a solid state laser to emit a beam of coherent radiation. Accordingly, in accordance with a second aspect of the present invention there is provided a solid state laser apparatus comprising:
 a apparatus for scanning a light beam through a crystal arrangement as hereinbefore described, and
 a solid state laser to emit a laser beam, which forms the light beam that is scanned by the apparatus for scanning a light beam through a crystal arrangement.

The apparatus for scanning a light beam through a crystal arrangement as previously hereinbefore described may be incorporated into an existing solid state laser. However, in view of the tolerances that are required between the solid state laser and the frequency conversion apparatus, this would normally be a difficult and non cost-effective procedure.

In accordance with a third aspect of the present invention there is provided a frequency conversion apparatus comprising:

a first crystal set having at least one non-linear optical crystal, a second crystal set having at least one non-linear optical crystal, said first crystal set is arranged to receive a beam of coherent radiation that passes through said first crystal set, said second crystal set is arranged to receive said beam after passage through said first crystal set, and said beam passes through said second crystal set, wherein one of said first and second crystal sets is aligned for frequency conversion of said beam in the cold state of that crystal set and the other of said first and second crystal sets is aligned for frequency conversion of said beam in the warm steady state of said other crystal set.

The frequency conversion apparatus in accordance with the third aspect of the present invention may be incorporated into a solid state laser apparatus that further includes a solid state laser.

Preferably, the first and second crystal sets are aligned for frequency conversion for said cold state or said warm steady state by adjusting the physical orientation of a respective said crystal in said first and second crystal sets.

Alternatively, or in addition, the first and second crystal sets may be aligned for frequency conversion in said cold state or said warm steady state by altering the temperature of a respective said crystal in said first and second crystal sets to adjust the crystal structure of said respective crystal.

Preferably, said first crystal set is aligned for frequency conversion in the cold state and said second crystal set is aligned for frequency conversion in the warm steady state.

In an alternative embodiment, the frequency conversion apparatus in accordance with the third aspect of the present invention further comprises beam splitter means to divert a component beam of shortest wavelength of the output beam from said first crystal set away from the remainder of the output beam from said first crystal set and said beam splitter means allows the remainder of the output beam from said first crystal set to pass to said second crystal set for frequency conversion therein.

In a further embodiment, the frequency conversion apparatus in accordance with the third aspect of the present invention further comprises beam combining means to receive the component beam of shortest wavelength diverted by said beam splitter means and the output beam from said second crystal set and to combine them into a single beam.

Preferably, said beam combining means comprises polarisation optics.

In accordance with a fifth aspect of the present invention there is provided a method of improving the frequency conversion efficiency of a frequency conversion system, of a laser apparatus, that has a first crystal set having at least one non-linear optical crystal, comprising:

placing a second crystal set having at least one non-linear optical crystal at the beam output end of said first crystal set, aligning one of said first and second crystal sets for frequency conversion of an input beam in the cold state of that crystal set, and aligning the other of said first and second crystal sets for frequency conversion of an input beam in the warm steady state of said other crystal set.

Preferably, aligning of one said first and second crystals sets for frequency conversion of said beam in the cold state or the warm steady state comprises adjusting the physical orientation of the respective crystal in said first and second crystal sets.

Alternatively, or in addition, aligning said first and second crystal sets for frequency conversion in the cold state or the warm steady state comprises altering the temperature of the respective said crystal in said first and second crystal sets to adjust the crystal structure of said respective crystal.

The apparatus for scanning a light beam through a crystal arrangement and the frequency conversion apparatus in accordance with the first and third aspects of the present invention may be used together and may be incorporated into a single laser apparatus that also comprises a solid state laser.

BRIEF DESCRIPTION OF THE DRAWINGS

The present invention will now be described, by way of example, with reference to the accompanying drawings in which.

BEST MODE(S) FOR CARRYING OUT THE INVENTION

Figure 1A:
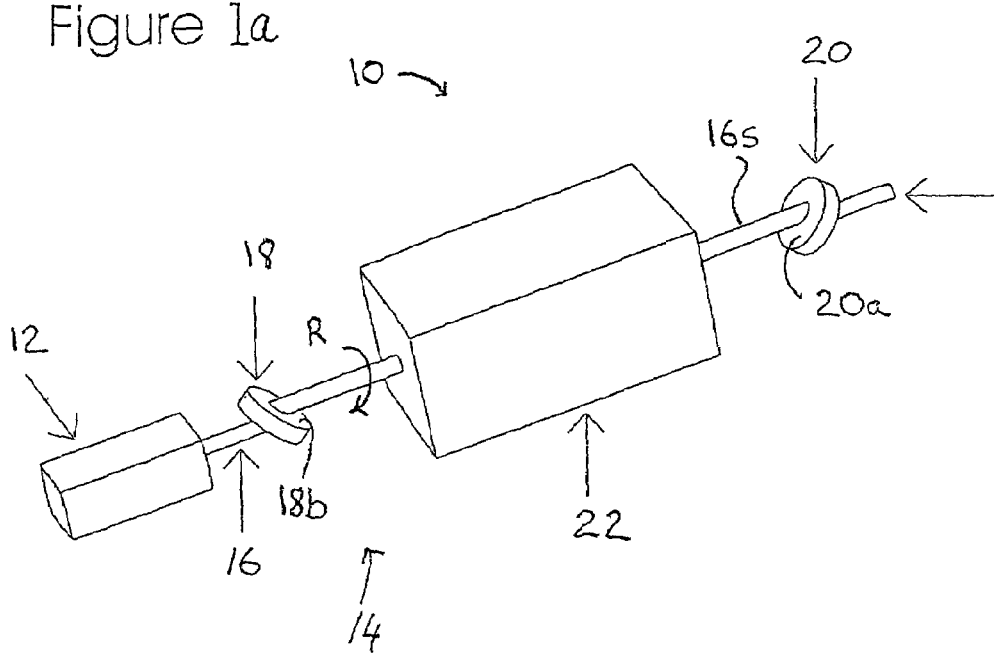
FIG. 1a is a perspective view of a portion of an embodiment of a solid state laser apparatus, incorporating a frequency conversion apparatus, in accordance with a first aspect of the present invention.
Figure 1B:
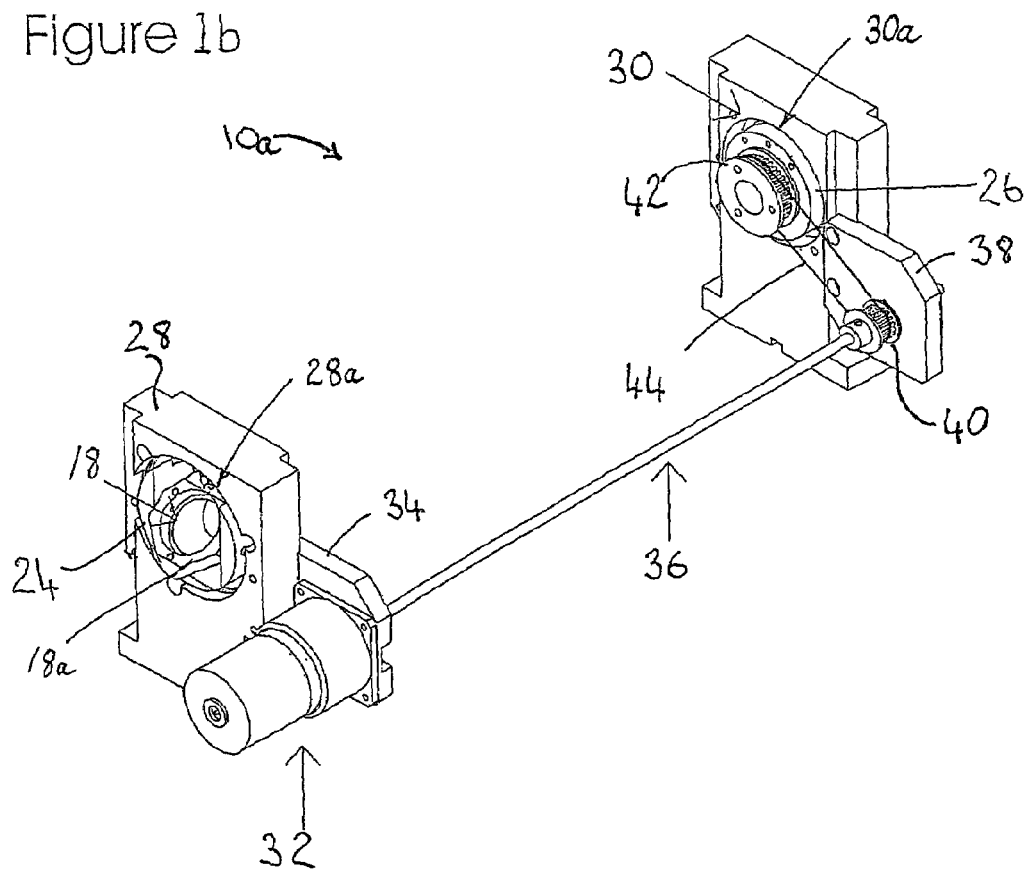
FIG. 1b is a first perspective view of an embodiment of an apparatus for scanning a light beam through a crystal arrangement, which also forms a further portion of the apparatus shown in FIG. 1.
Figure 1C:
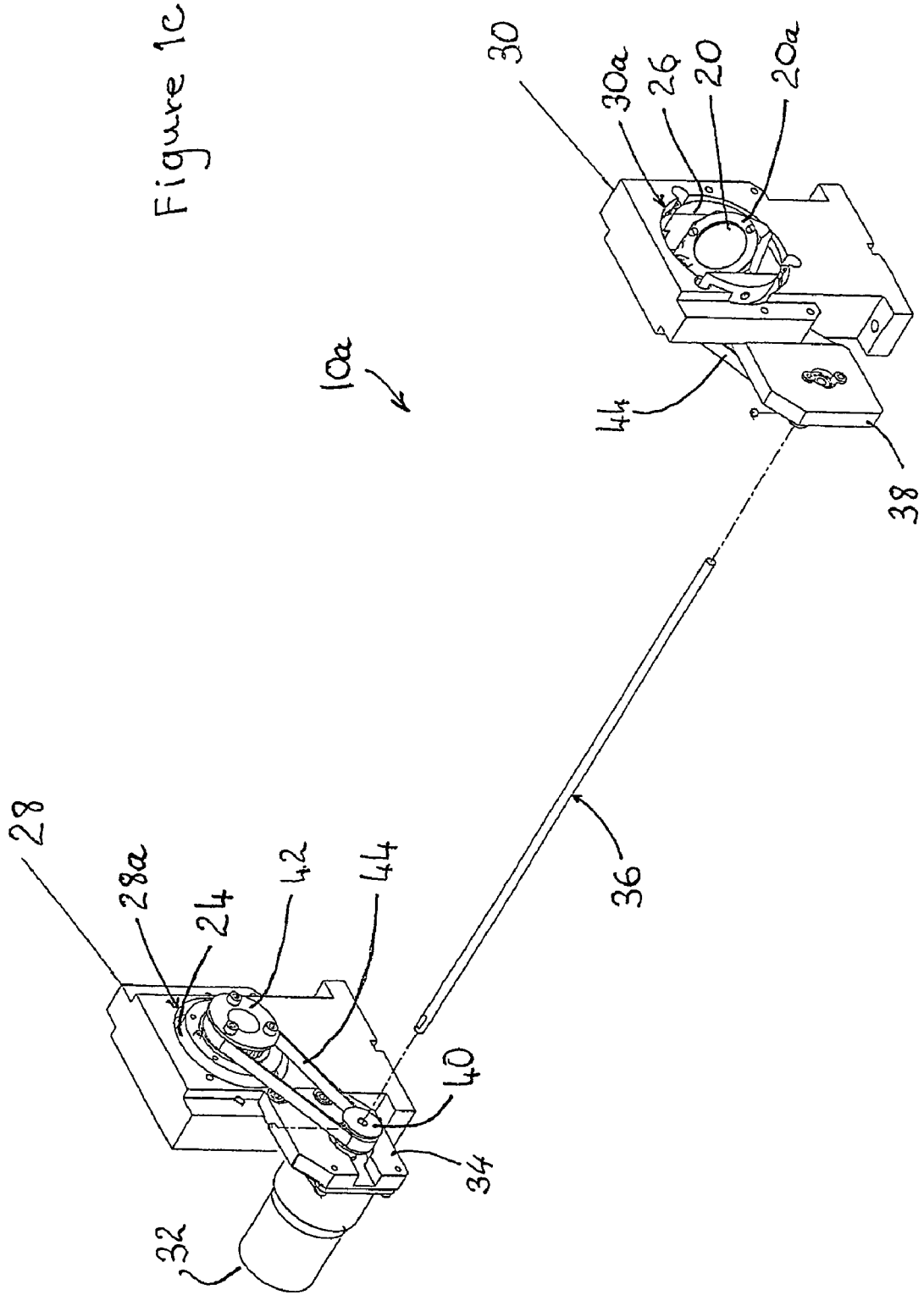
FIG. 1c is a second (exploded) perspective view of the apparatus shown in FIG. 1b.
Figure 2A:
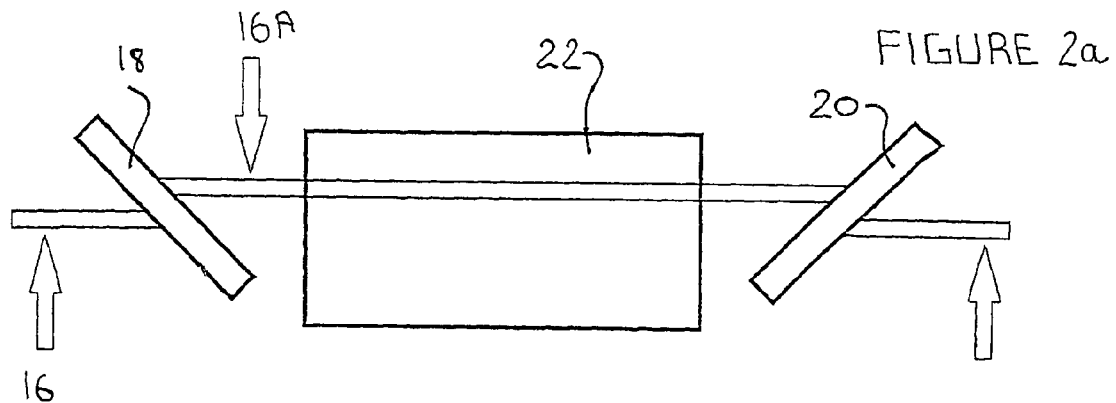
FIGS. 2a, 2b, 2c and 2d are views showing the two optics of the apparatus shown in FIGS. 1a and 2b in four sequential positions.
Figure 2B:
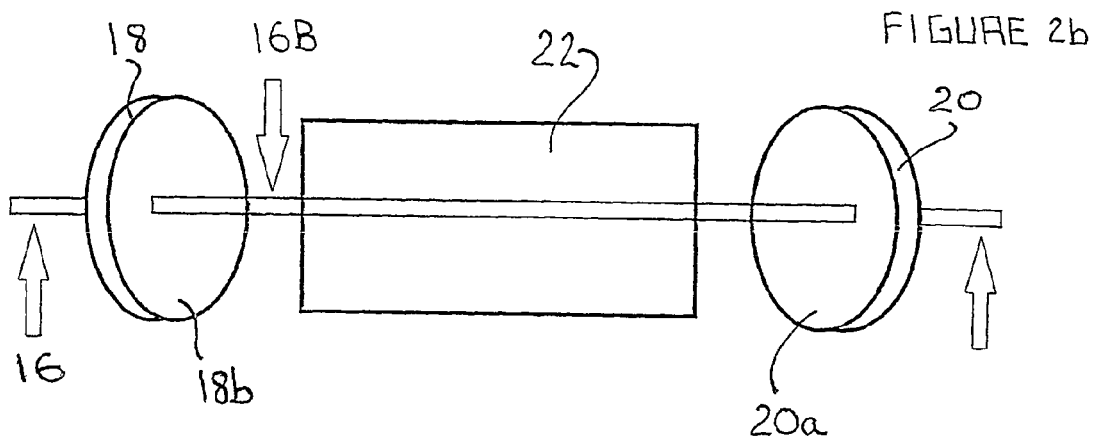
Figure 2C:
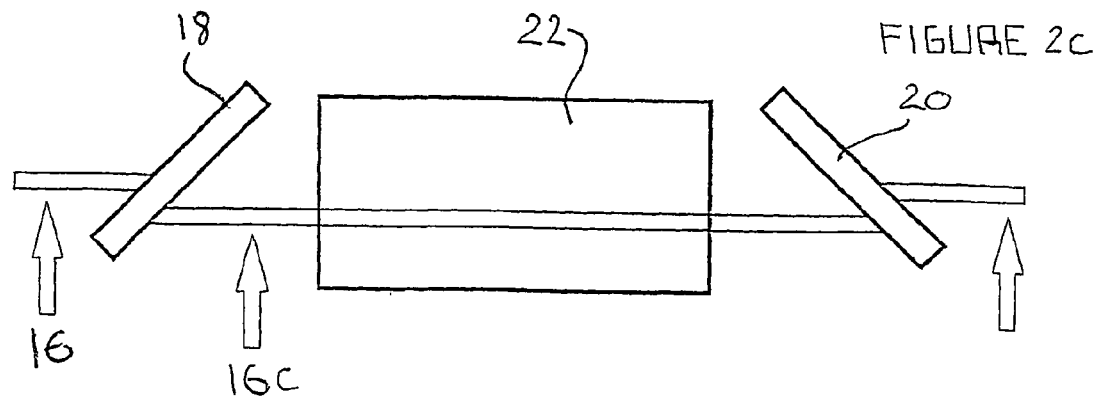
Figure 2D:
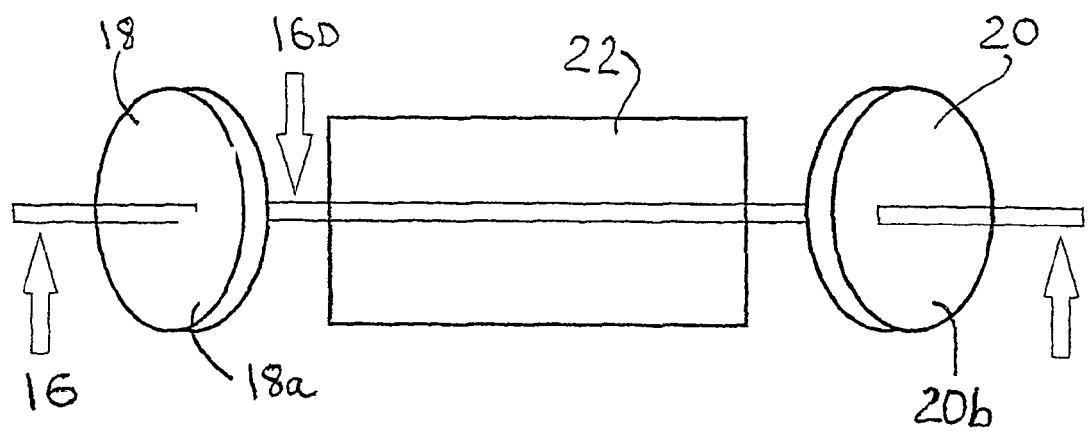

In FIGS. 1a, 1b and 1c there is shown an embodiment of a solid state laser apparatus 10 in accordance with one aspect of the present invention. The solid state laser apparatus 10 has been split into FIGS. 1a and 1b for visual clarity so as not to obscure features of the solid state laser apparatus 10. Additionally, FIGS. 1b and 1c shows an embodiment of an apparatus 10a for scanning a light beam through a crystal arrangement.

The solid state laser apparatus 10 comprises a solid state laser 12, a frequency conversion apparatus, or system, 14 and the apparatus 10a. The solid state laser 12 emits an infra-red (IR) beam 16 of coherent radiation. The frequency conversion apparatus 14 subjects the beam 16 to frequency conversion, i.e. harmonic generation.

The frequency conversion apparatus 14 comprises at least one NLO crystal 22, positioned between the first and second optics 18 and 20 of the apparatus 10a.

Each of the optics 18 and 20 of the apparatus 10a is supported by a support 24 and 26, respectively. The supports 24 and 26 are rotatably mounted in respective frame members 28 and 30 by bearings (that are obscured in the drawings). The frame members 28 and 30 have respective openings 28a and 30a therein to accommodate the supports 24 and 26. The supports 24 and 26 ring-like in form.

A motor 32 is provided to rotate the supports 24 and 26 in their respective frame members 28 and 30. The motor 32 is mounted on a bracket 34 which is connected to the frame member 28. A drive shaft 36 extends from the motor 32 between the bracket 34 and another bracket 38 that is supported by the frame member 30.

A first wheel 40 is mounted on the drive shaft 36 adjacent the bracket 34. A second wheel 42 is attached to the support 24 that supports the optic 18 in the frame member 28. Another wheel 40 is provided on the distal end of the drive shaft adjacent the bracket 38 and another wheel 42 is attached to the support 26 that supports the optic 20 in the frame member 30.

A chain or belt 44 extends between each pair of wheels 40 and 42, respectively. The wheels 40 rotate with the drive shaft 36 and the chain or belt 44 transfers rotation to the wheels 42 attached to the supports 24 and 26. In this way, the supports 24 and 26, and therefore the optics 18 and 20, rotate together in phase.

The drive shaft 36 extends between the brackets 34 and 38 such that it is transversely spaced from the axis of the beam 16.

The crystal 22 is positioned between the frames 28 and 30 and thereby between the first and second optics 18 and 20.

The optics 18 and 20 each have two flat parallel surfaces 18a, 18b and 20a, 20b, respectively.

The optics 18 and 20 are supported by their respective supports 24 and 26 such that they are tiltable, about a respective diametral line thereof, at an angle relative to the axis of the beam 16. To achieve this, each optic 18 and 20 is held in a respective frame 18a and 20a. Each frame 18a and 20a is pivotally attached to the respective supports 24 and 26. This may be done by using a pair of diametrically opposed pivot pins on each frame 18a and 20a. The pivot pins on each frame 18a and 20a are held in corresponding pin end receptors provided in the supports 24 and 26. The optics 18 and 20 are tilted at an angle that is greater than 0° and less than 90° relative to the axis of the beam 16.

The optics 18 and 20 are tilted in opposed directions such that they are rotationally 180° out of phase with one another.

The supports 24 and 26 rotate the optics 18 and 20, respectively, about an axis that is parallel to the beam 16.

Whilst a motor 32, drive shaft 36, wheels 40 and 42 and a chain or belt 44 is used to rotate the supports 24 and 26 and thereby the optics 18 and 20, alternative arrangements may be used to rotate the optics 18 and 20 provided that the optics 18 and 20 are rotated at the same speed.

In use, the beam 16 emitted by the solid state laser 12 passes through the optic 18. Due to the tilt of the optic 18, the path of the beam 16 is deviated by the optic 18 such that the beam 16, after it has passed through the optic 18, is no longer co-linear with the beam 16 prior to passage through the optic 18. However, the beam 16 after passage through the optic 18 is parallel to the beam 16 prior to passage through the optic 18. Thus, the beam 16 following passage through the optic 18 remains parallel to, and therefore at the required angle to pass through the crystal 22 for efficient harmonic generation.

Rotation of the optic 18 means that once the beam 16 passes through the optic 18, it spacially moves. This is illustrated in FIGS. 2a-2d and FIG. 3. FIGS. 2a-2d show four positions of the optics 18 and 20 in a cycle of rotation of the optics 18 and 20. Each of the FIGS. 2a, 2b, 2c and 2d is a sequential view of the position reached by the optics 18 and 20 after rotation through a further 90° from the position in the preceding figure. The direction of rotation of the optics 18 and 20 is shown by the arrow R in FIG. 1a. The beam 16 after passage through the optic 18 is identified by reference numerals 16A, 16B, 16C and 16D in FIGS. 2a, 2b, 2c and 2d, respectively.

Figure 3:
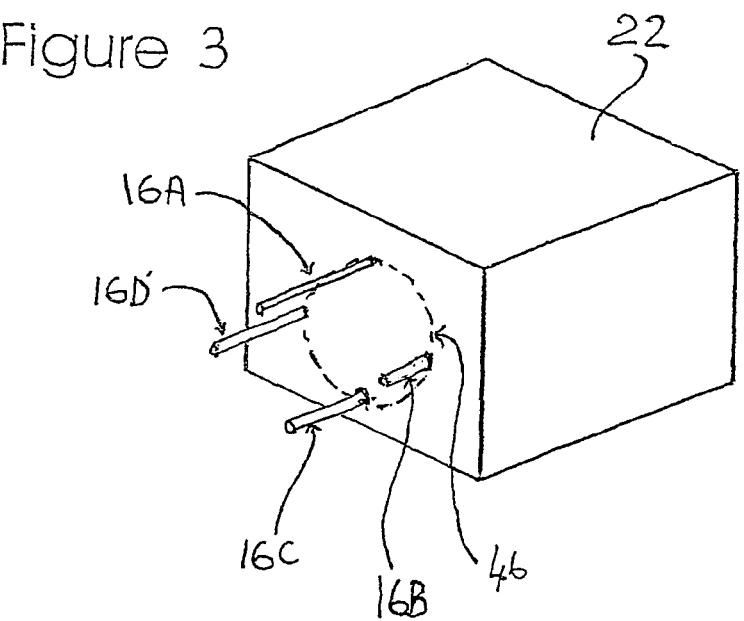
FIG. 3 shows the non-linear optical crystal of the apparatus shown in FIGS. 1a illustrating the sequential spatial positions of the beam entering the non-linear optical crystal corresponding to FIGS. 2a, 2b, 2c and 2d.

FIG. 3 shows the positions of the beams 16A, 16B, 16C and 16D of FIGS. 2a, 2b, 2c and 2d, respectively, when they impinge the surface of the crystal 22. The rotation of the optic 18 causes the path of the beam 16, after passage through the optic 18, to be spacially moved over time, or scanned, so that its paths form a cylindrical surface. Correspondingly, as the beam 16 moves in this way, it traces a circular pattern 46 on the surface of the crystal 22. The beam travel through the crystal 22 is similarly scanned through the crystal 22 so that the path through the crystal 22 changes and the beam 16 does not travel through the same region of the crystal 22.

Moving the beam 16 through the crystal 22 is this way distributes the thermal load from the beam 16 on the crystal 22 over a larger region than in the case of a non-scanned laser beam that constantly travels through the same region of the crystal. Distributing, or spreading out, the thermal load on the crystal 22 helps to keep the temperature of the crystal 22 closer to the initial state and minimises changes in temperature gradients. This maintains better stability of the frequency conversion performed by the crystal 22.

The shorter wavelength beam 16s that is output from the crystal 22, following frequency conversion thereby, will also be scanned to define a cylindrical surface when it exits the crystal 22. The output beam 16s passes through the rotating optic 20 which moves the output beam 16s back onto the original path of the input beam 16 (so that it is again co-linear with the beam 16) and de-scans the output beam 16s such that it no longer spatially moves over time, i.e. its spatial position overtime is constant.

As the output beam 16s has a wavelength different from that of the input beam 16, the optic 20 through which the output beam 16s passes may need to be of a different material, thickness and/or tilt angle so that the output beam 16s is returned to the path of the input beam 16 when it exits the optic 20.

In some applications, the optic 20 may not be required and the output beam 16s would be de-scanned in another way. For example, if the output beam 16s was to pass through another scanner device that is used as part of the material processing application on which the apparatus 10 is being used, the control of that scanner device could be adjusted to compensate for the changing position of the output beam 16s and thereby return the output beam 16s onto the path of the input beam 16.

In another alternative, some applications may not require that the output beam 16s is de-scanned. In such applications, the optic 20 may again be omitted and the output beam 16s would trace a circular pattern on the material being processed by the apparatus 10.

The optics 18 and 20 may be made from any suitable material that permits transmission therethrough of appropriate wavelengths, viz. IR wavelengths for the optic 18 and UV wavelengths for the optic 20. Such materials are known in the art.

Whilst the preceding embodiment has been described with only a single NLO crystal 22 being used, which will result in the output beam 16s being a second harmonic, it is to be understood that additional crystals 22 can be used to obtain an output beam 16s having higher harmonics, e.g. third, fourth, fifth harmonics.

The crystal 22 may be made of known materials for providing harmonic generation of the input beam as previously described herein.

Similarly, the solid state laser 12 may be of known type as previously described herein.

Figure 4:
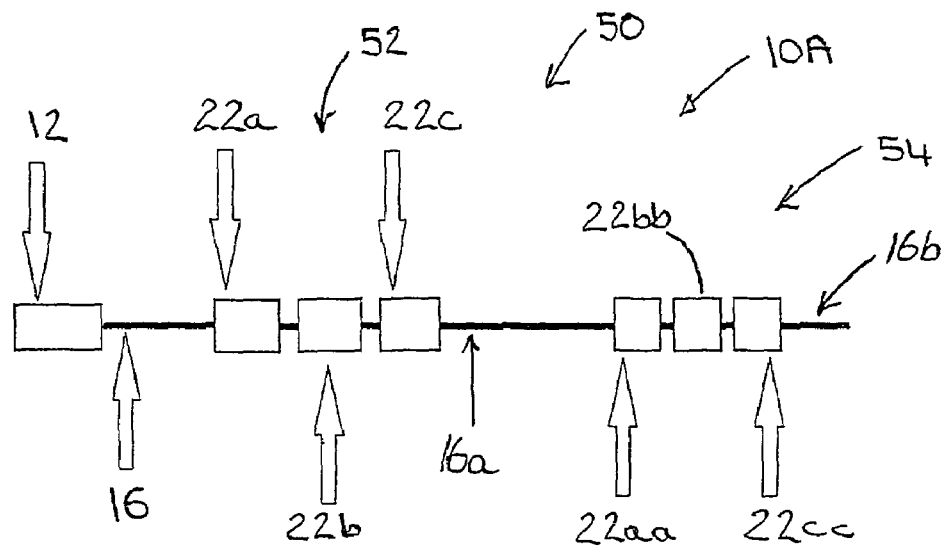
FIG. 4 is a schematic view of an embodiment of a solid state laser apparatus incorporating a first embodiment of a frequency conversion apparatus in accordance with a further aspect of the present invention.

In FIG. 4 there is shown an embodiment of a laser apparatus 10A in accordance with another aspect of the present invention. Similar components of the apparatus 10A and the apparatus 10 are denoted by similar reference numerals in FIG. 4. The apparatus 10A comprises a solid state laser 12 that is similar to the solid state laser 12 of the apparatus 10. The apparatus 10A further comprises a frequency conversion apparatus 50.

The frequency conversion apparatus 50 comprises a first crystal set 52 and a second crystal set 54. The first crystal set 52 comprises NLO crystals 22a, 22b and 22c. The second crystal set 54 comprises NLO crystals 22aa, 22bb, and 22cc.

Providing three crystals in the first and second crystal sets 52 and 54 results in the fifth harmonic of the input beam 16 of coherent radiation, being created by the frequency conversion performed by the crystals 22a, 22b and 22c and the crystals 22aa, 22bb and 22cc. However, a different, e.g. lesser, number of crystals may be provided in the first and second crystal sets 52 and 54 for generation of different, e.g. lesser, harmonics.

The beam 16 is received at the first crystal set 52 and passes through the crystals 22a, 22b and 22c of the first crystal set 52, and the output beam from the last crystal 22c, of the first crystal set 52, is identified by reference numeral 16a for ease of identification. The output beam 16a from the last crystal 22c of the first crystal set 52 is received at the second crystal set 54 and passes through the crystals 22aa, 22bb and 22cc of the second crystal set 54. The output beam from the last crystal 22cc of the second crystal set 54 is identified by reference numeral 16b for ease of identification.

The first crystal set 52 is aligned for frequency conversion, i.e harmonic generation, in the cold state. That is, the crystals 22a, 22b and 22c of the first crystal set 54 are aligned such that the angles of the crystal structures of the crystals 22a, 22b and 22c relative to the beam 16 received at the first crystal set 52, are orientated for efficient harmonic generation when the crystals 22a, 22b and 22c are in their cold state. The second crystal set 54 is aligned for frequency conversion, i.e. harmonic generation, in the warm steady state condition. That is, the crystals 22aa, 22bb and 22cc are aligned such that the angles of the crystal structures of the crystals 22aa, 22bb and 22cc relative to the beam 16A are orientated for efficient harmonic generation when the crystals 22aa, 22bb and 22cc are in their warm steady state.

The alignment of the crystals 22a, 22b and 22c of the first crystal set 52 and the alignment of the crystals 22aa, 22bb and 22cc of the second crystal set 54 may be performed by physically adjusting the spatial orientation of the crystals 22a, 22b, 22c, 22aa, 22bb and 22cc relative to the beams 16 and 16a, respectively, and/or by adjusting the temperature of the crystals 22a, 22b 22c, 22aa, 22bb and 22cc to alter the orientation of the crystal structures within the crystals 22a, 22b, 22c, 22aa, 22bb and 22cc.

This alignment may be carried out by first running the laser 12 at a slow pulse rate, e.g. 1 Hz. The crystals 22a, 22b and 22c of the first crystal set 52 are then aligned (as previously hereinbefore described) to obtain optimum harmonic generation in their cold state. The output beam 16a from the first crystal set 52 is monitored during this procedure to determine when the alignment of the crystals 22a, 22b and 22c is producing optimum harmonic generation, i.e. the power output of the beam 16a output from the first crystal set 52 is monitored. Alignment of the crystals 22aa, 22bb and 22cc of the second crystal set 54 is carried out by running the laser 12 at a high pulse rate, e.g. over 200 Hz, for a period of about 3-5 minutes. This will bring the temperature of the crystals 22aa, 22bb and 22cc of the second crystal set 54 to their warm steady state condition temperature. The crystals 22aa, 22bb and 22cc are then aligned (as previously hereinbefore described) to obtain optimum harmonic generation. Again, the power output of the beam 16b output from the second crystal set 54 is monitored to determine the alignment of the crystals 22aa, 22bb and 22cc that produces optimum harmonic generation in the beam 16b for the warm steady state.

When the apparatus 10A is first switched on, all of the crystals in the first and second crystal sets 52 and 54 are in their cold state. Further, since the crystals 22a, 22b and 22c of the first crystal set 52 are aligned for harmonic generation in the cold state, the crystals 22a, 22b and 22c will produce high energy of all the harmonics in the beam 16a. Passing the beam 16a through the second crystal set 54 would suggest that back conversion would result, i.e. the short wavelengths in the beam 16a would be converted back to longer wavelengths, which would reduce the overall efficiency of the frequency conversion. However, since the crystals 22aa, 22bb and 22cc of the second crystal set 54 are aligned for harmonic generation in their warm steady state condition, there would be little or no back conversion of the beam 16a by the second crystal set 54 when the apparatus 10A is first switched on. The second set of crystals 22aa, 22bb and 22cc are exposed to all the harmonics and close to their final energy. Thus, the crystals 22aa, 22bb and 22cc in the second crystal set 54 will quickly reach their warm steady state condition temperature.

The frequency conversion efficiency of the crystals 22a, 22b and 22c of the first crystal set 52 will decrease as the crystals warm up. However, this decrease in frequency conversion efficiency of the first crystal set 52 will be compensated for by the increasing frequency conversion efficiency obtained from the crystals 22aa, 22bb and 22cc of the second crystal set 54 as they warm up and reach their warm steady state condition.

Appropriate selection of properties of the crystals in the first and second crystal sets 52 and 54 makes it possible to have the changes in frequency conversion efficiency of the first and second crystal sets 52 and 54 cancel each other so that the final energy in the output beam 16b is stable. The property that is most readily adjusted to achieve this optimum stable energy state is the lengths of the crystals 22a, 22b and 22c and the crystals 22aa, 22bb and 22cc in the first and second crystal sets 52 and 54, respectively. However, both the material of which the crystals in the first and second crystal sets 52 and 54 are made and the temperature of those crystals are also properties that can be selected or adjusted to achieve the optimum stable energy state.

In the preceding embodiment, the crystals 22a, 22b and 22c of the first crystal set 52 are aligned for efficient harmonic generation in the cold state and the crystals 22aa, 22bb and 22cc of the second crystal set 54 are aligned for efficient harmonic generation in the warm steady state. However, this may be reversed. That is, the crystals 22a, 22b and 22c of the first crystal set 52 may be aligned for efficient harmonic generation in their warm steady state and the crystals 22aa, 22bb and 22cc may be aligned for efficient harmonic generation in their cold steady state. This alternative will, however, result in reduced performance efficiency. This is because in the alternative, the output beam 16 from the solid state laser does not first pass through crystals that are aligned for efficient harmonic generation in the cold state.

Figure 5:
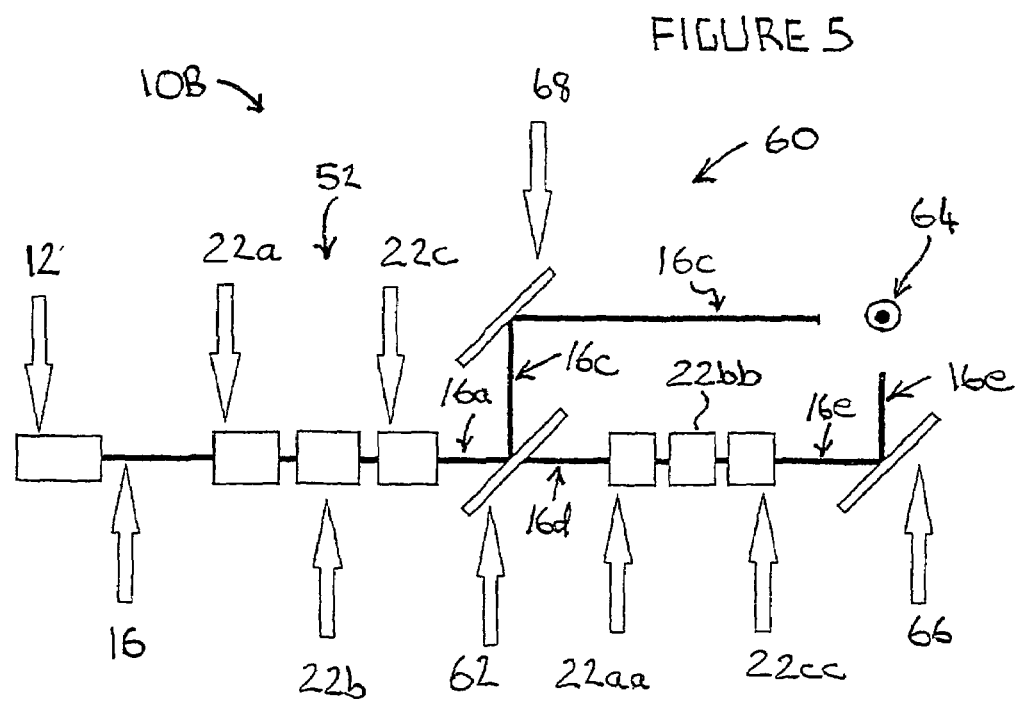
FIG. 5 is a schematic view of a second embodiment of a solid status laser apparatus incorporating a second embodiment of a frequency conversion apparatus in accordance with the further aspect of the present invention.

In FIG. 5 there is shown an embodiment of another solid state laser apparatus 10B in accordance with the present invention. Similar components of the apparatus 10B and the apparatus 10A are denoted by similar reference numerals in FIG. 5. The apparatus 10B comprises a solid state laser 12 similar to that of the apparatus 10 and 10A. The apparatus 10B further comprises a frequency conversion apparatus 60.

The frequency conversion apparatus 60 is similar to the frequency conversion apparatus 50 of the embodiment shown in FIG. 4 except that a beam splitter 62 is provided between the first and second crystal sets 52 and 54. The beam splitter 62 reflects the shortest wavelength component of the output beam 16a from the first crystal set 52 and this is identified as the beam 16c in FIG. 5. The remainder of the beam 16a passes through the beam splitter 62. The remainder of the beam 16a that passes through the beam splitter 62 is identified by reference numeral 16d in FIG. 5. The beam 16d is a mixture of wavelengths including IR, but not any of the shortest wavelength component as that has been reflected by the beam splitter 62. In the embodiment shown in FIG. 5, where three crystals are used in the first and second crystal sets 52 and 54, the frequency conversion by the first and second crystal sets 52 and 54 produces the fifth harmonic. Thus, the beam 16c consists of the fifth harmonic wavelengths. The beam 16d passes through the crystals 22aa, 22bb and 22cc of the second crystal set and is able to undergo frequency conversion to produce the output beam 16e. The output beams 16e has the same wavelength as the beam 16c.

The beams 16b and 16c may be directed to a target point 64 by respective mirrors 66 and 68.

Alternatively, the beams 16b and 16c may be directed to separate target points (not shown) in which case the arrangements of the mirrors 66 and 68 are omitted.

Figure 6:
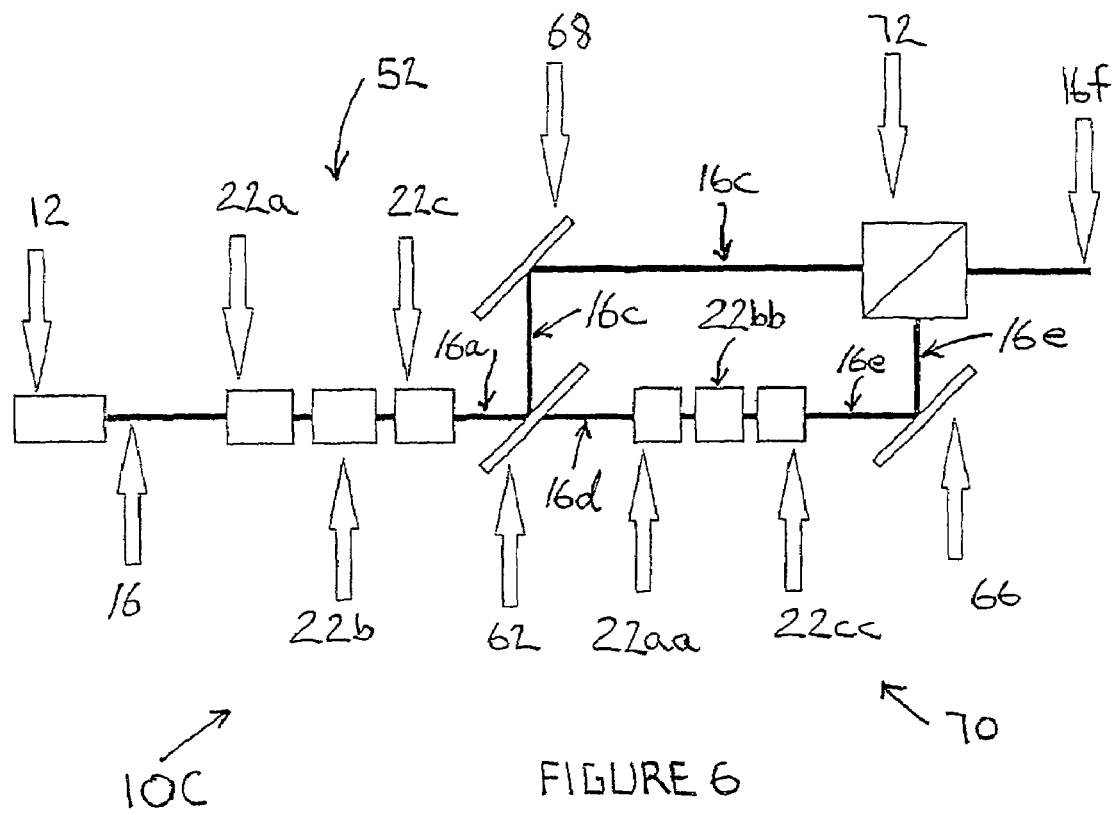
FIG. 6 is a schematic view of another embodiment of a solid state laser apparatus incorporating a third embodiment of a frequency conversion apparatus in accordance with the third aspect of the present invention.

In FIG. 6 there is shown an embodiment of a laser apparatus 10C in accordance with the present invention. Similar components of the apparatus 10C and the apparatus 10B are denoted by similar reference numerals in FIG. 6. The apparatus 10C comprises a solid state laser 12 similar to that of the apparatus 10B. The apparatus 10C further comprises a frequency conversion apparatus 70.

The frequency conversion apparatus 70 comprises first and second crystal sets 52 and 54, beam splitter 62, mirrors 66 and 68 similar to those of the apparatus 10B. The frequency conversion apparatus 70 further comprises polarisation optics 72 to combine the beams 16c and 16e (which are the output beams resulting from frequency conversion by the first and second crystal sets 52 and 54, respectively). The polarisation optics 72 combine the two beams 16c and 16e to produce a single output beam 16f.

The frequency conversion apparatus 14 hereinbefore described with reference to FIGS. 1a to 3 and a frequency conversion apparatus 10A, 10B or 10C hereinbefore described with reference to FIGS. 4, 5 and 6, respectively, may be incorporated in a single solid state laser apparatus.

Figure 7:
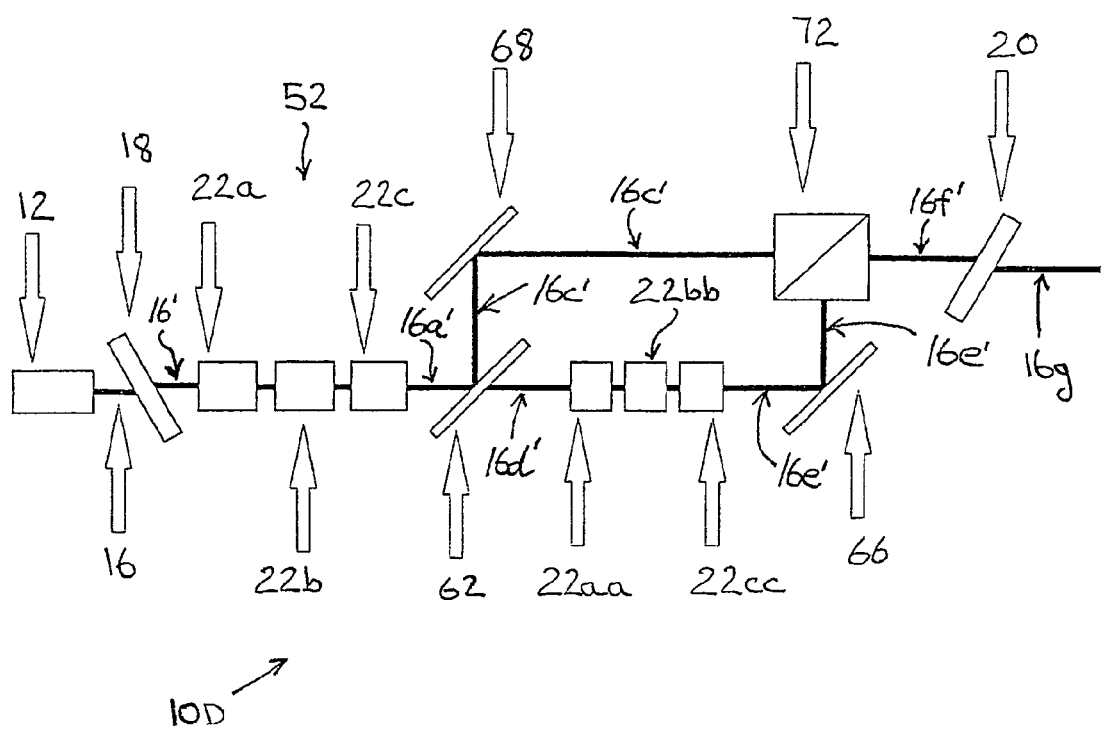
FIG. 7 is a schematic view of an embodiment of a solid state laser apparatus incorporating a frequency conversion apparatus of the solid state laser apparatus illustrated in FIGS. 1a to 3 and a frequency conversion apparatus illustrated in FIG. 4.

By way of example of this, FIG. 7 shows the frequency conversion apparatus 14 and the frequency conversion apparatus 70 incorporated in a single solid state laser apparatus 10D.

In the solid state laser apparatus 10D, the single crystal 22 of the frequency conversion apparatus 14 incorporated in the solid state laser apparatus 10 is replaced by first and second crystal sets 52 and 54 as used in the frequency conversion apparatus 70 (shown in FIG. 6), the optic 18 is provided prior to the first crystal set 54 and the optic 20 is provided after the polarisation optics 72.

The beam 16 emitted by the solid state laser device 12 is deviated and caused to spatially move, i.e. be scanned, following passage therethrough as previously hereinbefore described with reference to the solid state laser apparatus 10. This results in the beam being scanned when it passes through or is reflected by the other components in the solid state apparatus 10D, i.e. from the first crystal set 52 to the optic 20. The optic 20 de-scans the beam as it passes therethrough resulting in a de-scanned beam 16g. In FIG. 7, a superscript (') is used to denote the beam when it is in a scanned condition.

In an analogous manner, the frequency conversion apparatus 14 of the solid state laser apparatus 10 can be incorporated in a single solid state laser apparatus with the frequency conversion apparatus 50, shown in FIG. 4, or the frequency conversion apparatus 60, shown in FIG. 5.

In any such arrangements in which the frequency conversion apparatus of the solid state laser apparatus 14 shown in FIGS. 1a to 3 is incorporated in a single solid state laser apparatus with one of the frequency conversion apparatuses 50, 60 or 70, the second optic 20 may be omitted. Omission of the optic 20 has been previously hereinbefore described with reference to the embodiment illustrated in FIGS. 1a to 3. Omission of the optic 20 means that the final beam is not de-scanned.

It is also to be understood that the embodiment described with reference to FIGS. 5, 6 and 7 and variations thereof as hereinbefore described may use a lesser or greater number of crystals 22 in the first and second crystal sets 52 and 54. However, in normal operation, the same number of crystals 22 would be used in the first and second crystal sets 52 and 54.

A Brewster window may be provided at a suitable location on the beam output side of the frequency conversion systems hereinbefore described.

Modifications and variations such as would be apparent to the skilled addressee are deemed to be within the scope of the present invention.

The invention claimed is:

1. A frequency conversion apparatus comprising:
   a first crystal set having at least one non-linear optical crystal,
   a second crystal set having at least one non-linear optical crystal,
   said first crystal set is arranged to receive a beam of coherent radiation that passes through said first crystal set,
   said second crystal set is arranged to receive said beam after passage through said first crystal set, and said beam passes through said second crystal set,
   wherein one of said first and second crystal sets is aligned for efficient harmonic generation by frequency conversion of said beam in a cold state of that crystal set wherein said cold state is a state prior to heating of a crystal set by absorbed laser energy and the other of said first and second crystal sets is aligned for efficient harmonic generation by frequency conversion of said beam in a warm steady state of said other crystal set, wherein said warm steady state is a state when a crystal set has been heated by absorbed laser energy and the heating has reached a steady state.

2. A frequency conversion apparatus according to claim 1, wherein the first and second crystal sets are aligned for efficient harmonic generation by frequency conversion for said cold state or said warm steady state by adjusting the physical orientation of a respective said crystal in said first and second crystal sets.

3. A frequency conversion apparatus according to claim 1, wherein the first and second crystal sets are alignable for efficient harmonic generation by frequency conversion in said cold state or said warm steady state by altering the temperature of a respective said crystal in said first and second crystal sets to adjust the crystal structure of said respective crystal.

4. A frequency conversion apparatus according to claim 1, wherein said first crystal set is aligned for efficient harmonic generation by frequency conversion in the cold state and said second crystal set is aligned for efficient harmonic generation by frequency conversion in the warm steady state.

5. A frequency conversion apparatus according to claim 1, further comprising beam splitter means to divert a component beam of shortest wavelength of the output beam from said first crystal set away from the remainder of the output beam from said first crystal set and said beam splitter means allows the remainder of the output beam from said first crystal set to pass to said second crystal set for efficient harmonic generation by frequency conversion therein.

6. A frequency conversion apparatus according to claim 5, further comprising beam combining means to receive the component beam of shortest wavelength diverted by said beam splitter means and the output beam from said second crystal set and to combine them into a single beam.

7. A frequency conversion apparatus according to claim 6, wherein said beam combining means comprises polarization optics.

8. A laser apparatus comprising:
a solid state laser, and
a frequency conversion apparatus according to claim 1.

9. A method of improving the frequency conversion efficiency of a frequency conversion system, of a laser apparatus, that has a first crystal set having at least one non-linear optical crystal, the method comprises:
placing a second crystal set having at least one non-linear optical crystal at the beam output end of said first crystal set,
aligning one of said first and second crystal sets for efficient harmonic generation by frequency conversion of an input beam in the cold state of that crystal set, and
aligning the other of said first and second crystal sets for efficient harmonic generation by frequency conversion of an input beam in the warm steady state of said other crystal set, wherein said cold state is a state prior to heating of a crystal set by absorbed laser energy and said warm steady state is a state when a crystal set has been heated by absorbed laser energy and the heating has reached a steady state.

10. A method according to claim 9, wherein aligning of one said first and second crystals sets for efficient harmonic generation by frequency conversion of said beam in the cold state or the warm steady state comprises adjusting the physical orientation of the respective crystal in said first and second crystal sets.

11. A method according to claim 9, wherein aligning said first and second crystal sets for efficient harmonic generation by frequency conversion in the cold state or the warm steady state comprises altering the temperature of the respective said crystal in said first and second crystal sets to adjust the crystal structure of said respective crystal.

12. A laser apparatus comprising:
a solid state laser, and
a frequency conversion apparatus according to claim 2.

13. A laser apparatus comprising:
a solid state laser, and
a frequency conversion apparatus according to claim 3.

14. A laser apparatus comprising:
a solid state laser, and
a frequency conversion apparatus according to claim 4.

* * * * *